United States Patent [19]

Staub, Sr.

[11] 4,366,949

[45] Jan. 4, 1983

[54] LEAF CATCHING AND COLLECTING DEVICE

[76] Inventor: Thomas J. Staub, Sr., Rte. 2, 504 Washington Blvd., Browns Mills, N.J. 08015

[21] Appl. No.: 185,304

[22] Filed: Sep. 8, 1980

[51] Int. Cl.³ .................... E04H 17/00; A01D 46/22; B65D 65/02

[52] U.S. Cl. ........................................ 256/1; 256/12.5; 256/48; 56/329; 150/52 R

[58] Field of Search ............... 256/12.5, 48, 45, 32; 56/329; 150/52 R; 4/498, 503; 139/420 R

[56] References Cited

U.S. PATENT DOCUMENTS

| | | | |
|---|---|---|---|
| 1,447,957 | 3/1923 | Blung | 56/329 |
| 1,476,853 | 12/1923 | Tabor | 256/1 |
| 1,618,739 | 2/1927 | Wenzin | 256/1 X |
| 2,025,289 | 12/1935 | Kasten | 256/48 |
| 2,519,678 | 8/1950 | MacKenzie | 56/329 |
| 2,766,797 | 10/1956 | Cowen | 150/52 R |
| 2,870,455 | 1/1959 | Reeves | 139/420 R |
| 4,200,127 | 4/1980 | Dunleavy | 56/329 X |
| 4,296,788 | 10/1981 | Slater | 150/52 R |

FOREIGN PATENT DOCUMENTS

| | | | |
|---|---|---|---|
| R 15215 | 7/1956 | Fed. Rep. of Germany | 256/1 |
| 2142162 | 3/1973 | Fed. Rep. of Germany | 256/12.5 |

*Primary Examiner*—James Kee Chi
*Attorney, Agent, or Firm*—Birch, Stewart, Kolasch & Birch

[57] ABSTRACT

A leaf catching and collecting device and method for use are provided including post members to be driven into the ground and extend above the ground with hooks on the post to receive one edge of a flexible netting which is laid over the ground and held to the ground by hooks along the leading edge toward the source of the leaves and after the leaves collect on the netting, it is unhooked and the leaves gathered in the netting for discard.

8 Claims, 8 Drawing Figures

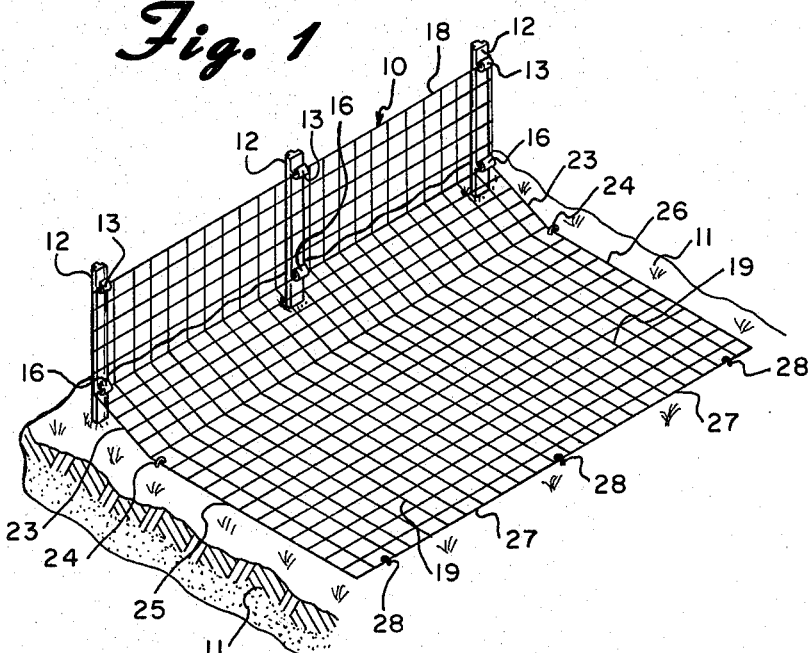
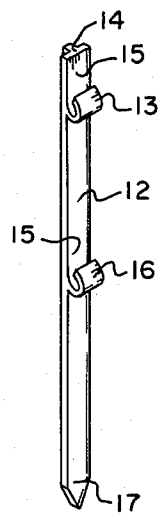
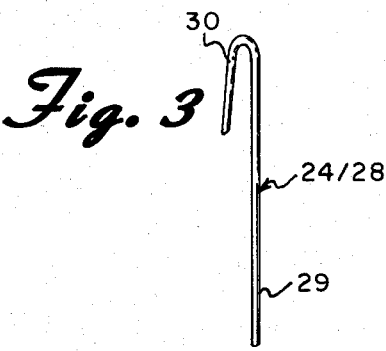
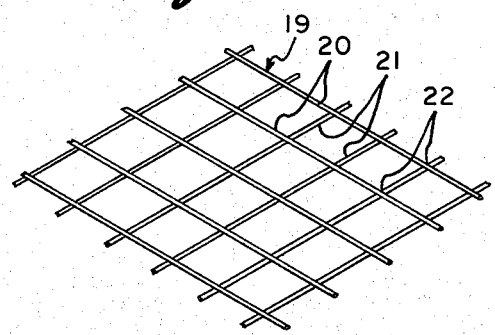
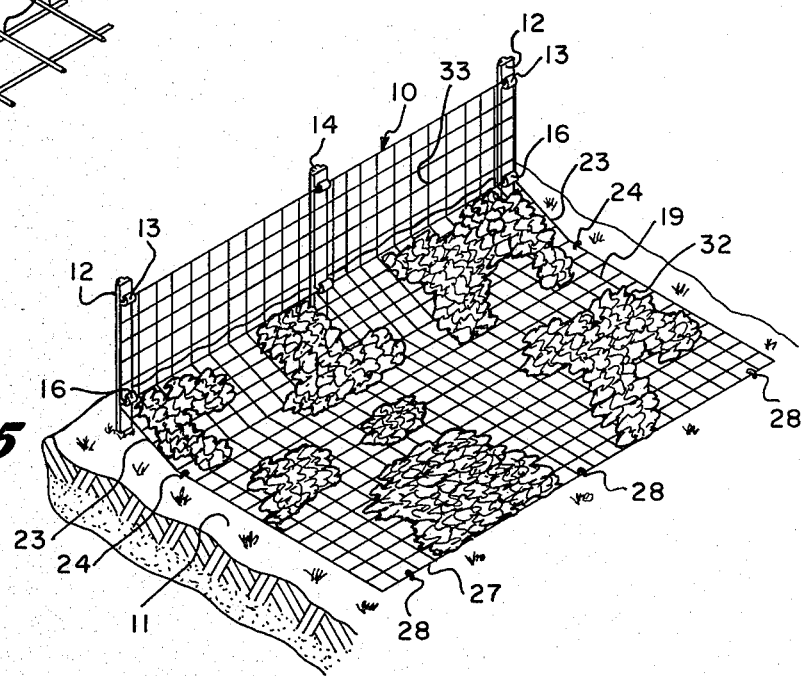

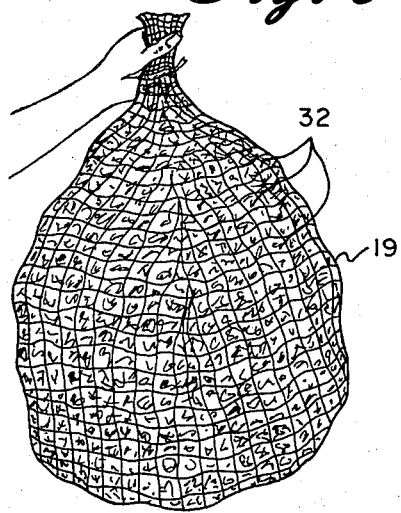
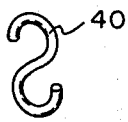
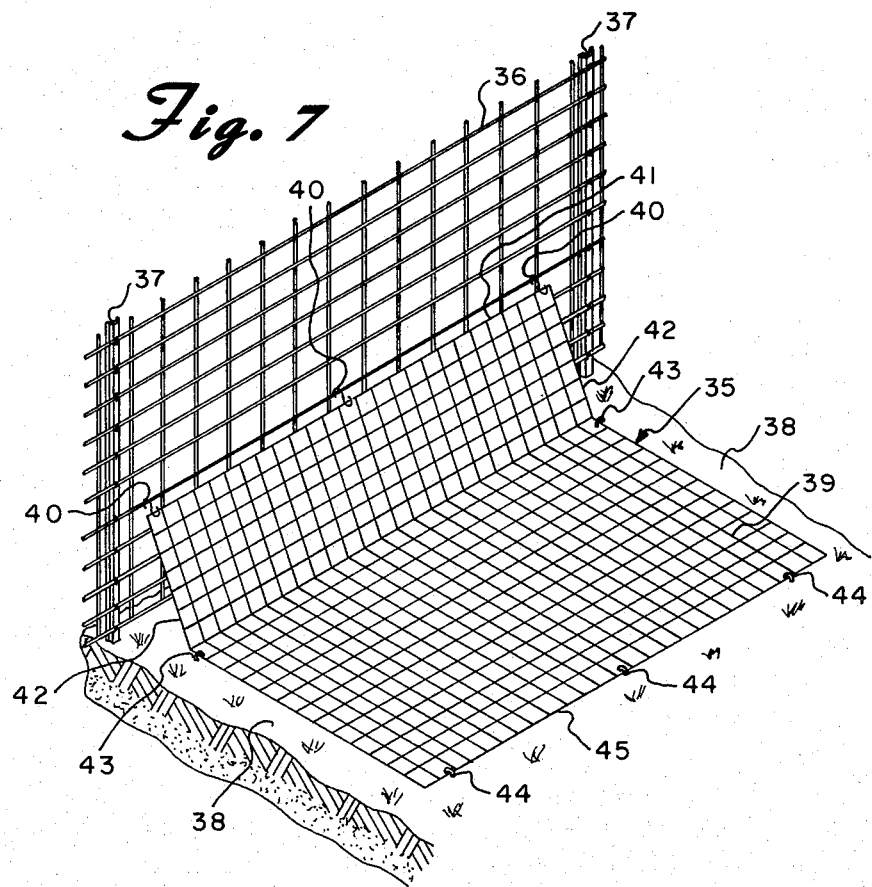

LEAF CATCHING AND COLLECTING DEVICE

BACKGROUND OF THE INVENTION

In residential communities, raking, collection and discarding of leaves is a major task in the fall of each year. The job of raking, picking up, storing and discarding in the trash is an effort that typically includes most members of a family. With rigid air pollution controls, it is no longer possible to burn the leaves on the location in a pile or in an outdoor burning device. The common practice is to rake the leaves into a pile and after considerable effort, arrange to pick them up and pack them into plastic bags which are carried to the curb and picked up by the local trash collector. In some cases, the leaves are stored in silage pit areas and recycled as fertilizer after biodegradation takes place naturally or with the aid of chemicals. In some cases, the raking process is a considerable burden because of health, age or some infirmity.

The present invention provides a device and a method by which the process of raking is essentially eliminated, allowing the homeowner to merely collect the leaves in a form in which they may be discarded directly to the trash collector or dumped into another container.

The prior art includes a wind break disclosed in U.S. Pat. No. 3,226,091, to V. N. Root. An ensilaging means and method is described in U.S. Pat. No. 3,427,790 to W. J. Flitti. A screen is described in U.S. Pat. No. 3,540,587, to Henry D. Dawbarn in his method for depositing particles. Wilkins, in his U.S. Pat. No. 3,762,454, describes a disposable garbage container in the form of a bag. Weed barriers and fence borders are described in a number of patents including U.S. Pat. No. 3,768,780 to Tommie Cowles, et al., in U.S. Pat. No. 3,806,096, to John Eccleston, et al., and in U.S. Pat. No. 3,822,864 to Gary Keys. An accident screen is provided in U.S. Pat. No. 4,186,912, to obscure an accident site and prevent slowdown of traffic passing the site of the accident.

None of these devices satisfy the needs of the homeowner nor do they satisfy the following objects.

It is an object of this invention to provide a device and method which will collect leaves on the ground and allow their transport directly to the point of discard.

It is an additional object of this invention to provide a device which will stop the leaves from being blown onto a chosen location in the yard and will further collect the leaves in a device for discard.

It is an additional object of this invention to provide a device and a method by which an area recognized as a collection place for leaves on the yard may be equipped to allow collection of the leaves with little or no raking required.

It is a further object of this invention to provide a device which may be angled to receive the leaves and cause them to collect and pile up on the device for further collection.

It is a further object of this invention to provide a device that not only aids in collection of the leaves at a particular location on the yard, but allows their pickup and carrying with little or no need of additional tools and equipment.

It is an object of this invention to provide a device and method to allow collection of leaves in areas of the yard where no natural barrier is present to prevent the blowing of the leaves off the yard or to another part of the yard.

It is a further object of this invention to collect leaves around shrubs, trees and on flower gardens.

It is a particular object of this invention to provide a collection device and method that allows leaves to cover and protect perennial plants during the winter and yet allow for easy pickup of the leaves in the spring before the plants come up.

SUMMARY OF THE INVENTION

It has been observed by the inventor that on essentially every lawn there are areas where the leaves tend to collect. In addition, there are areas where the leaves are blown past a certain section and over a certain area of ground. In some cases, the leaves collect against the house, in others against a wall, and in other cases against a fence or some other object. Accordingly, a device and method has been invented to collect the leaves and allow immediate pickup, storage and discard of the leaves from these locations. Once the leaves have been picked up from the congregating areas, the balance of the leaves will either blow away or can easily be collected at another time at the same locations. The leaf catcher and collection device is located in the collection areas by placing at least two post members, preferably three in number, of sufficient rigidity and strength to be driven into the ground and of sufficient length to extend above the ground, generally about one foot. Typically, these post members are placed close to a structure that is tending to stop the leaves from blowing in that direction, such as the side of a house, a wall, fence or the like. In some cases, because of the wind patterns around the structures the post members are placed in an area past which the leaves are known to blow. Each post has at least one, preferably two, hooks on each post located at a height above the ground on which one edge of netting is hung. A flexible netting having a first edge hanging on the post members, two side edges and a leading edge directed toward the source of the leaves, such as a tree, bush or the like. At least two, preferably three, ground hooks hold the leading edge to the ground such that the leaves enter over that leading edge and rest on and against the upraised portion of the flexible netting. It is preferred that there be at least two additional hooks located a short distance from the post members on the side edges to hold the netting to the ground typically at an angle from the ground to the lowest of the post hooks.

The method of utilizing this device includes driving the post members into the ground spaced apart a distance approximating the width of the net. One edge of the flexible netting is hooked over hooks located on the post members a distance above the ground, generally at least one foot. The flexible netting is spread over the ground with the leading edge directed toward the source of the leaves. Ground hooks hold the leading edge to the ground and preferably additional ground hooks located on the edges of the flexible netting hold the netting to the ground near the post members.

BRIEF DESCRIPTION OF DRAWINGS

FIG. 1 is a perspective view showing the leaf catcher and collection device of this invention in position to collect the leaves.

FIG. 2 is a closeup view of a post used to hold the netting of this invention above the ground.

FIG. 3 is a drawing of a ground hook used to hold the netting to the ground.

FIG. 4 is a partial closeup view of the netting.

FIG. 5 is a perspective view of the device of this invention after leaves have been allowed to collect on the netting.

FIG. 6 is a perspective view of the netting after it has been unhooked from its location still holding the leaves collected on the surface.

FIG. 7 is a perspective view illustrating the use of this invention wherein the netting has been hooked onto a wire fence.

FIG. 8 is a closeup view of an "S" hook used to hold the netting against the fence as illustrated in FIG. 7.

DESCRIPTION OF PREFERRED EMBODIMENTS

Leaf catching and collecting device 10 is shown as a perspective view in FIG. 1 positioned on ground 11 at a location where leaves are known to collect or to at least blow past that location. Stakes 12, three in number, are each driven into the ground along the lines where the two furthest stakes are about five feet apart and the middle stake is about halfway in between. Stake 12 is injection molded of a thermoplastic polymer such as acrylonitrile-styrene copolymer, polymethyl methacrylate, or like rigid polymers as shown in more detail in FIG. 2. Upper hook 13 is molded into stake 12 and located close to top 14. Hook 13 bends backward toward front face 15 and almost touches that front face so as to hook and hold a filament placed over the hook. Lower hook 16 is shaped in the manner as hook 13 and extends back toward front face 15 to engage and hold a filament hooked over it. Lower hook 16 is located about ten inches from pointed end 17 so that when stake 12 is driven in the ground lower hook 16 will be about four inches above the ground level. Plastic net 19, as illustrated in FIG. 4, is constructed of plastic filaments 20 and 21 crossed and woven into cross filaments, heat bonded at intersections 22 to form an approximately one inch grid. The filaments are extruded of a polyolefin polymer such as polyethylene, polypropylene, or the like in about a fifteen mil diameter. Net 19 is hooked over upper hooks 13 and lower hooks 16 and spread over the ground to cover an area about five foot square. The net is pulled taut along the ground away from lower hooks 16 forming an inclined portion 23 held in place by fixing ground hooks 24 along edges 25 and 26 of net 19. Upper edge 18 is about 13 inches above ground level. Leading edge 27 of the net directed toward the source of the leaves is held against ground 11 by three ground hooks 27 which may be metal rod formed in the shape of a hook or may be injection molded out of a rigid plastic similar to that of stake 12. Ground hooks 24 and 28 are identical except for their position as illustrated in FIG. 3 with long end 29 which is driven into the ground and short hook end 30 which holds net 19 at ground level.

In FIG. 5 the leaf catching and collecting device 10 is shown in the same position as illustrated in FIG. 1 except that leaves 32 have been allowed to collect on the top of net 19, not only on that portion that rests on ground 11 but also on the inclined portion 23 which tends to collect additional leaves because of its position and location next to vertical portion 33.

In FIG. 6 plastic net 19, constructed to provide great flexibility and formability, has been unhooked from upper hooks 13, lower hooks 16 and ground hooks 24 and 28 and has been removed after the leaves have collected, as illustrated in FIG. 5. By gathering the corners of net 19 leaves 32 are collected and discarded, with the net, or, preferably, transported to a location for dumping and the net reused. Ties may be provided to secure the net around the leaves, much in the same way trash bags are used to discard leaves.

In FIG. 7 another embodiment of the present invention is illustrated as leaf catching and collecting device 35. In this embodiment, fence 36 strung on post 37 is located at a point where leaves tend to collect on ground 38. Net 39, essentially identical to net 19, is spread over the ground with approximately one foot of its length hooked onto fence 16 with "S" hooks 40 constructed of seven-sixteenths inch diameter steel, hooking on one end upper edge 41 of net 39 and on the other end to fence 36 about twelve inches above ground 38. Net 39 is held against ground 38 at an inclined plane 42 that is close to the vertical by ground hooks 43 along the side edges of net 39. Ground hooks 44 hold the leading edge 45 of net 39 to the ground in order to allow the leaves to blow onto the surface of net 39 and be collected in the same fashion as hereinabove described.

While the instant invention has been described in connection with specific embodiments, it is to be clearly understood that this description is made only by way of example and is not intended to be limitative in the scope as set forth in the following claims:

I claim:

1. A device for catching and collecting leaves and other debris for expedient disposal which comprises a flexible netting means for gathering and collecting said debris or leaves, said netting means comprising a leading edge, which, when said net is in position, is directed toward the source of said debris or leaves, two side edges and a rear edge set away from said debris or leaves, means for securing said leading edge of said netting means to a surface upon which said netting is disposed, means for attaching said rear edge of said netting means and means for securing said side edges of said netting means to said surface upon which said netting is disposed at a position a short distance from said attaching means for said rear edge such that said netting is held between said rear edge and said position of securing said side edges at an inclined plane which enhances the leaf and debris collecting capability of said device.

2. The device as disclosed in claim 1, wherein said means for attaching said rear edge of said netting comprises at least two stake means including hooks thereon for attaching said netting thereto.

3. The device as disclosed in claim 1, wherein said means for attaching said rear edge of said netting comprises a hook device which attaches said net to an already existing barrier, such as a fence.

4. A method for collecting and gathering leaves and other debris from an associated leaf and debris collecting surface which comprises providing a catcher or collecting device comprising a flexible netting comprising a rear edge, two side edges and a leading edge, attaching said rear edge to a support such that said rear edge of said flexible netting is elevated a short distance above said leaf and debris collecting surface, securing said two side edges of said netting a short distance from said rear edge to said collecting surface such that an inclined plane portion is established between said rear edge and said secured side edges, and securing said leading edge of said flexible netting in a direction facing the source of said leaves or debris to said collecting surface in a manner such that said leaves or debris will be readily collected on the surface of said flexible netting.

5. The method as described in claim 4, further including the step of removing said flexible netting from said collecting surface and said rear edge support and folding the edges thereof in such a manner so as to confine said leaves or debris gathered thereon.

6. The method as disclosed in claim 4, wherein said rear edge of said flexible netting is attached to at least two stake members having at least two hooks thereon for attaching said flexible netting thereto.

7. The method as disclosed in claim 4, wherein said collecting surface comprises the ground.

8. The method as disclosed in claim 4, wherein said rear edge of said flexible netting is attached to an already existing barrier, such as a fence.

* * * * *